(12) United States Patent
Lonsway

(10) Patent No.: US 6,575,119 B1
(45) Date of Patent: Jun. 10, 2003

(54) SUSPENDED DOG AMUSEMENT APPARATUS

(76) Inventor: Gene A. Lonsway, 2004 Homestead Rd., Chapel Hill, NC (US) 27516

( * ) Notice: Subject to any disclaimer, the term of this patent is extended or adjusted under 35 U.S.C. 154(b) by 0 days.

(21) Appl. No.: 10/146,187

(22) Filed: May 15, 2002

(51) Int. Cl.[7] .............................................. A01K 29/00
(52) U.S. Cl. ...................................... 119/708; 119/707
(58) Field of Search ................................ 119/702, 707, 119/708

(56) References Cited

U.S. PATENT DOCUMENTS

| | | | |
|---|---|---|---|
| 3,181,504 A | 5/1965 | Stortz | 119/708 |
| 3,295,499 A | 1/1967 | Manchester | 119/708 |
| 3,312,195 A | 4/1967 | Rohena | 119/707 |
| 3,454,275 A | 7/1969 | Pontone | 119/708 |
| 3,476,086 A | 11/1969 | Way | 119/707 |
| 3,830,202 A | 8/1974 | Garrison | 119/707 |
| 4,438,727 A | 3/1984 | Thompson | 119/708 |
| 4,499,855 A | 2/1985 | Galkiewicz | 119/708 |
| 4,517,922 A | 5/1985 | Lind | 119/708 |
| 4,712,510 A | 12/1987 | Tae-Ho | 119/709 |
| 5,092,272 A | 3/1992 | O'Rourke | 119/709 |
| 5,111,771 A | 5/1992 | Mathews | 119/708 |
| 5,474,032 A | 12/1995 | Krietzman et al. | 119/708 |
| 5,575,241 A | 11/1996 | Line | 119/708 |
| 5,924,387 A * | 7/1999 | Schramer | 119/708 |
| 5,941,196 A * | 8/1999 | Domanski | 119/708 |
| 6,314,913 B1 * | 11/2001 | Lettau et al. | 119/707 |
| 6,318,300 B1 * | 11/2001 | Renforth et al. | 119/708 |
| 6,360,694 B1 * | 3/2002 | Noto | 119/707 |

* cited by examiner

*Primary Examiner*—Charles T. Jordan
*Assistant Examiner*—Elizabeth Shaw
(74) *Attorney, Agent, or Firm*—Jenkins & Wilson, P.A.

(57) ABSTRACT

A suspended dog amusement apparatus, system and method are disclosed for amusing and exercising large breed dogs. The apparatus comprises a bar, a first suspension element for suspending the bar from a horizontal member at a support point on the bar, a weight element secured to the bar that applies a first gravitational torque to the bar about the support point, and a second suspension element secured to the bar that comprises a strand-like member attached to a resilient dog toy and which produces a second gravitational torque to the bar about the support point. When the apparatus is at rest, the gravitational torque forces produced by the weight element and the second suspension element are in counterbalanced equilibrium. When a dog engages the apparatus, the first and second gravitational torques are such as to provide an unpredictable and random movement of the resilient dog toy. A suspended dog amusement system is also disclosed that comprises the above-referenced elements plus a first suspension system comprising a strand-like member, an anchor, and a plurality of pass-through devices for raising and lowering of the apparatus by the dog's owner. Finally, a method for providing amusement and exercise to a dog is disclosed.

8 Claims, 6 Drawing Sheets

SUSPENDED DOG AMUSEMENT APPARATUS

TECHNICAL FIELD

The present invention relates generally to the field of pet toys and exercise devices for pets. More particularly, the present invention relates to a device for the amusement and exercising of large breed dogs.

BACKGROUND ART

As dog owners are well aware, large breed dogs greatly enjoy chasing and catching certain objects and tugging and pulling against the object as if in a tug-of-war match. Also, as dog owners are aware, most dogs enjoy the chase and ensuing pulling match even more if the object of the dog's attention is thrown or pulled with an unpredictable movement other than anticipated by the dog.

Various types and configurations of dog tug toys have been known and widely used for years as therapeutic and entertainment tools. Examples of dog tug toys are found in U.S. Pat. No. 5,092,272 to O'Rourke; U.S. Pat. No. 3,830,202 to Garrison; and U.S. Pat. No. 3,476,086 to Way.

A variety of suspended animal exercise and amusement devices have also been developed over the years. U.S. Pat. No. 5,575,241 to Line discloses an animal exercise and amusement device consisting of a vertical post, a hollow shank attached to the top of the post, and a rope or elastic cord with a play toy connected that is attached through the shank to the post. U.S. Pat. No. 5,474,032 to Krietzman et al. discloses a pet toy and exercise device comprising a plurality of wands, a tether and a target object that is mounted over the top of a door to allow a pet to interact with the device. Krietzman et al. may further include a counterweight and a stop mounted on the tether to increase the eccentricity of the orbit of the object. U.S. Pat. No. 5,111,771 to Mathews describes an exercise and amusement toy for pets including a reinforced rubber tube stuffed with sponge rubber that is attached to a rope which is in turn attached to a resilient tether suspended from a mounting bracket, tree limb, or other horizontal member.

U.S. Pat. No. 4,712,510 to Tae-Ho describes a pet toy consisting of a stuffed play object at the end of a tether that is secured to flexible telescoping wand that may be secured to a vertical surface. U.S. Pat. No. 4,517,922 to Lind describes a device for the amusement of pets including a flat horizontal base and a post secured to the base to which a coiled spring with a cord and a pet toy is suspended. U.S. Pat. No. 4,499,855 to Galkiewicz discloses an entertaining and exercising toy comprising a rod to which a non-stretchable cord is attached, a pet toy being attached to the cord and a human operator manipulates the rod. U.S. Pat. No. 3,295,499 to Manchester discloses an animal amusement and exercising device consisting of a base and a horizontal member that is attached to the base to which a rope containing a pet toy is attached. Finally, U.S. Pat. No. 4,438,727 to Thompson discloses a mobile unit for a kitten or similar small animal and includes at least two freely suspended rods, one of which is suspended from the other. Thompson is designed for a light animal and is strictly designed to produce an irregular bounding type movement to intrigue a kitten or other small animal.

Applicant believes that all of the aforesaid efforts have been designed to address the entertainment and therapeutic needs of either different animals than those contemplated to be entertained by the present invention and/or to assess those needs in a different way. The present invention is provided to create an amusement device wherein the counterweight mechanism and the ratio of the support point bar length combine in a critical manner to provide a resistant force for the amusement of dogs.

DISCLOSURE OF THE INVENTION

In accordance with the present invention, applicant provides a suspended dog amusement apparatus, system and method for amusing and exercising large breed dogs. The apparatus comprises a bar having proximal and distal ends and a center point, a first suspension element for suspending the bar from a horizontal member at a support point on the bar, a weight element secured to the bar that applies a first gravitational torque to the bar about the support point, and a second suspension element secured to the bar that comprises a strand-like member attached to a resilient dog toy and which produces a second gravitational torque to the bar about the support point. In a preferred embodiment, the total length of the bar is in the range of 3 to 4 feet, the ratio of the distance between the distal end of the bar to the support point and the distance between the proximal end of the bar to the support point is approximately 3:1, and the weight element has a weight in the range of about 7 to 10 pounds. When the apparatus is at rest, the gravitational torque forces produced by the weight element and the second suspension element are in counterbalanced equilibrium. When a dog engages the apparatus, the first and second gravitational torques are such as to provide an unpredictable and random movement of the resilient dog toy.

A suspended dog amusement system is also disclosed that comprises the above-referenced elements plus a first suspension system comprising a strand-like member, an anchor, and a plurality of pass-through devices for raising and lowering of the apparatus by the dog's owner.

Finally, a method for providing amusement and exercise to a dog is disclosed comprising the steps of providing a dog and a suspended dog amusement apparatus comprising the above-referenced elements.

It is therefore an object of the present invention to provide a dog amusement apparatus for the amusement and exercise of large breed dogs.

It is another object of the present invention to provide a suspended dog amusement apparatus that exhibits unpredictable and random movement when engaged by a dog.

It is still another object of the present invention to provide a method of amusing and exercising large breed dogs with a random movement suspended dog amusement apparatus.

Some of the objects of the invention having been stated hereinabove, other objects will become evident as the description proceeds when taken in connection with the accompanying drawings as best described hereinbelow.

DETAILED DESCRIPTION OF THE INVENTION

Figure 1:
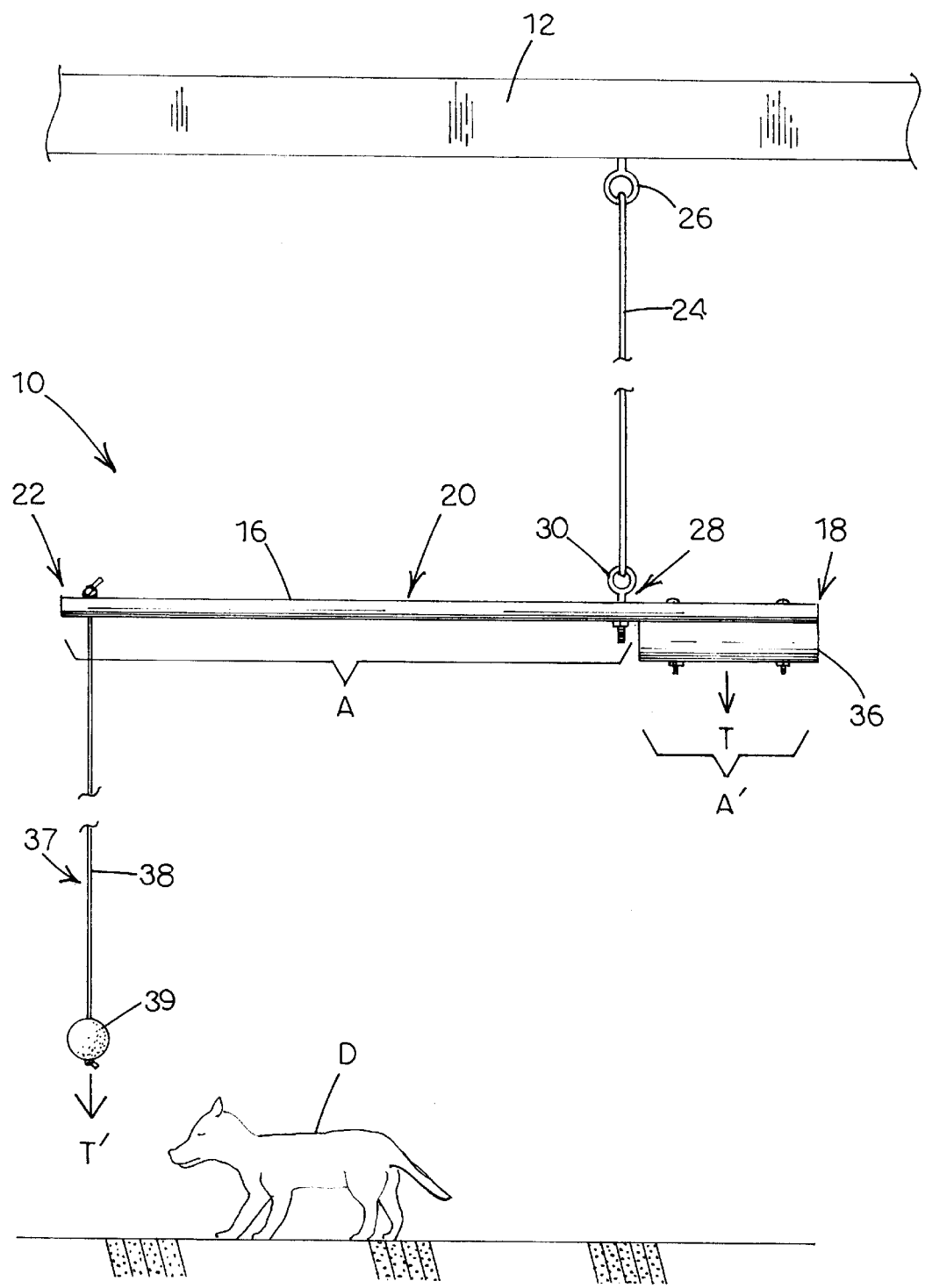
FIG. 1 is a side elevation view of the suspended dog amusement apparatus of the present invention.

Referring to FIG. 1, a suspended dog amusement apparatus 10 is adapted to be suspended from a horizontal member 12. The horizontal member 12 can consist of a tree branch, a beam, or any other horizontal structure that can support the weight of the apparatus 10 and the forces to be encountered by the dog D pulling on the apparatus 10. The apparatus 10 includes a counterbalance bar 16 made of wood or like materials. In a preferred embodiment, the bar 16 has a length in the range of three feet to four-and-a-half feet, and preferably four feet. The bar has a proximal end 18, a center point 20, and a distal end 22, and while it is envisioned in the preferred embodiment that the shaft of the bar be in a cylindrical shape, other shapes of the bar shaft are envisioned without departing from the present invention.

A first suspension element 24 for suspending bar 16 from above consists of cable, rope, or other strand-like material and is attached at one end to a pass-through device 26, such as an eyebolt or the like, that is rigidly attached to the horizontal member 12 above. The first suspension element 24 attaches to the bar 16 at a support point 28 located between the center point 20 of the bar 16 and the proximal end 18 of the bar 16 through the use of an eyebolt 30 or the like that is rigidly attached to the bar 16. In order to provide the most effective torque to counteract the pulling forces produced by the dog D, the ratio of the distance A between the distal end 22 of the bar to the support point 28 and the distance A' between the proximal end 18 of the bar to the support point 28 is approximately 3 to 1.

Further shown in FIG. 1, a stabilizing member or weight element 36 is secured to the bar 16 at a location between the support point 28 and the proximal end 18 of the bar 16 and applies a first gravitational torque T to the bar 16 about the support point 28. The weight element 36 is preferably a solid block of lead or like material and is of a predetermined weight. In a preferred embodiment, the weight element 36 has a weight in the range of 7 to 10 pounds, and preferably 8 pounds. The weight element 36 is rigidly attached to the underside of the bar 16 through the use of bolts or similar attachment means.

A second suspension element 37 that the dog D will actively engage is secured to the distal end 22 of the bar 16 and comprises a length of strand-like material 38 as a tether, such as rope or chain, that is attached to a resilient dog toy 39. This second suspension element 37 is of such a length to enable the dog D to engage the dog toy 39 when the apparatus 10 is at rest but is not so long as to rest on the ground when the apparatus 10 is at static rest. The second suspension element 37 produces a second gravitational torque T' to the bar 16 about the support point 28 wherein the weight element 36 and the second suspension element 37 are in counterbalanced equilibrium when the apparatus 10 is at static rest.

As further shown in FIG. 1, the off-center location of the support point 28 in the distance ratio of 3 to 1 from the distance A between the distal end 22 of the bar to the support point 28 and the distance A' between the proximal end 18 of the bar to the support point 28 and the presence of weight element 36 with a weight range of 7 to 10 pounds is selected so that equal gravitational torque forces are present between the support point 28 and the proximal end 18 and the support point 28 and the distal end 22. Because these gravitational torque forces around the support point 28 are equal when the apparatus 10 is at static rest, the bar 16 will remain horizontal when in a static or at rest position.

Figure 2:
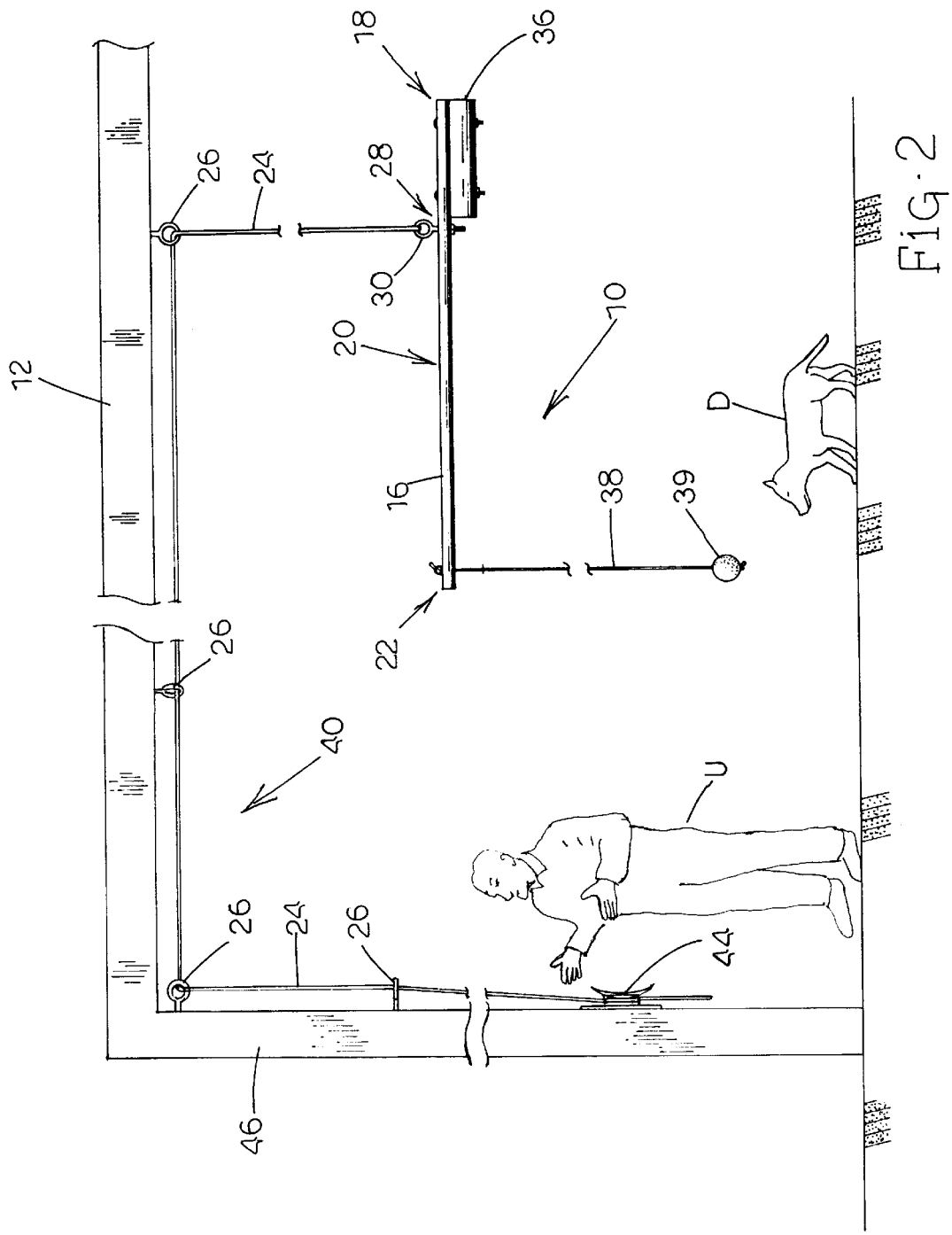
FIG. 2 is a side elevation view of the suspended dog amusement apparatus of the present invention that also employs a suspending system.

As shown in FIG. 2, another embodiment of the present invention is shown and consists of the suspended dog amusement apparatus 10 in conjunction with a first suspension system 40 that allows the dog's owner or system user U to control the height of the apparatus 10 in an easy fashion. This embodiment consists of the apparatus 10 in the same proportions as described above with a further system 40 for suspending the apparatus that comprises a cable, rope, or other strand-like member 24 that passes through a plurality of pass-through devices 26 and is secured to an anchor 44 near ground level.

The strand-like member 24 of the suspending system 40 is attached to the apparatus 10 in a manner similar to that described above. The other end of the strand-like member 24 is then passed through a plurality of pass-through devices 26, such as eye-bolts or the like, and is run along the horizontal member 12 until reaching a vertical member 46 to which the horizontal member 12 is attached. This vertical member 46 may be the trunk of a tree to which a tree limb is attached or the side of building in which a horizontal beam is attached. The strand-like member 24 then runs vertically down the vertical member 46 through a plurality of the pass-through devices 26 until reaching and being secured to an anchor 44 that is attached to the vertical member 46. The anchor 44 can consist of any device suitable for securing a strand-like member, such as a cleat, and is located at a position along the vertical member 46 at which the user or dog owner U can reach it. In order to lower the apparatus 10, the owner U would merely unsecure the strand-like member 24 from the anchor 44 and allow the strand-like member 24 to proceed upward and outwardly through the pass-through devices 26 thus lowering the apparatus 10 towards the ground. Conversely, in order to raise the apparatus 10 the user U would merely pull on the strand-like member 24 thus pulling the apparatus 10 upward and would secure the strand-like member 24 to the anchor 44 at the desired level.

Figure 3A:
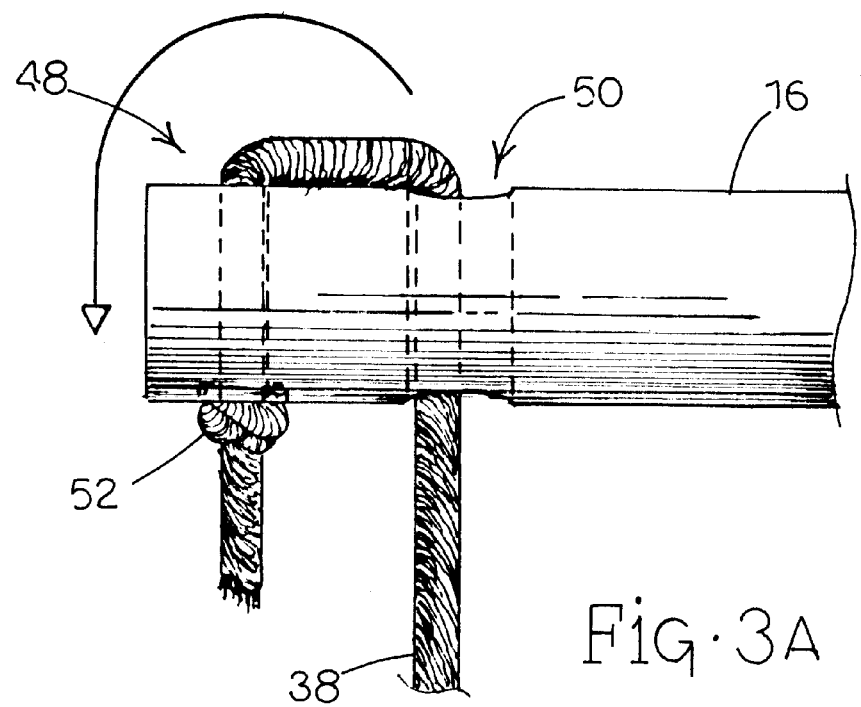
FIG. 3A is a side elevation view of the bar of the apparatus of the present invention equipped with a quick-release mechanism.
Figure 3B:
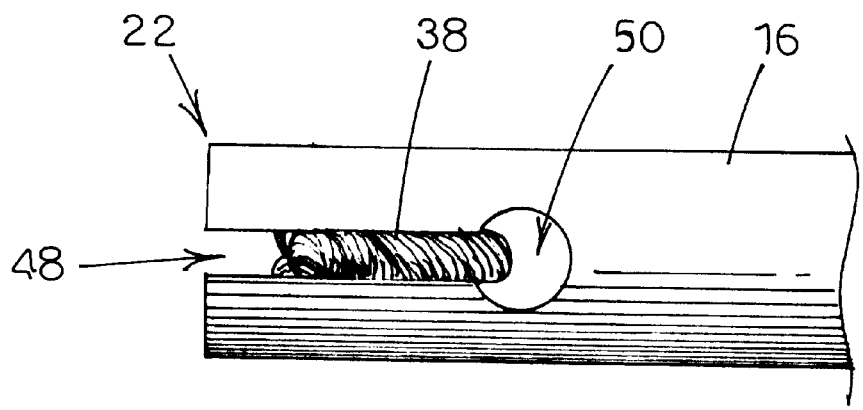
FIG. 3B is a top plan view of the bar of the apparatus of the present invention shown in FIG. 3A above.

A quick-release mechanism of the present invention is detailed in FIGS. 3A and 3B. The counterbalanced bar 16 of the present invention that is equipped with a quick-release mechanism contains a notch 48 on the distal end 22 of the bar and also contains an aperture or hole 50 just inside of the notch, towards the center point 20 of the bar 16. The strand-like member 38 of the second suspension element 37 is knotted on one end and this knot 52 is passed through the hole 50, looped over the top of bar 16 and the knot 52 is then secured under the notch 48. The quick-release mechanism allows the owner U to rapidly remove the strand-like member 38 of the second suspension element 37 should an emergency occur, such as the rope getting wrapped around the dog's neck.

Figure 4:
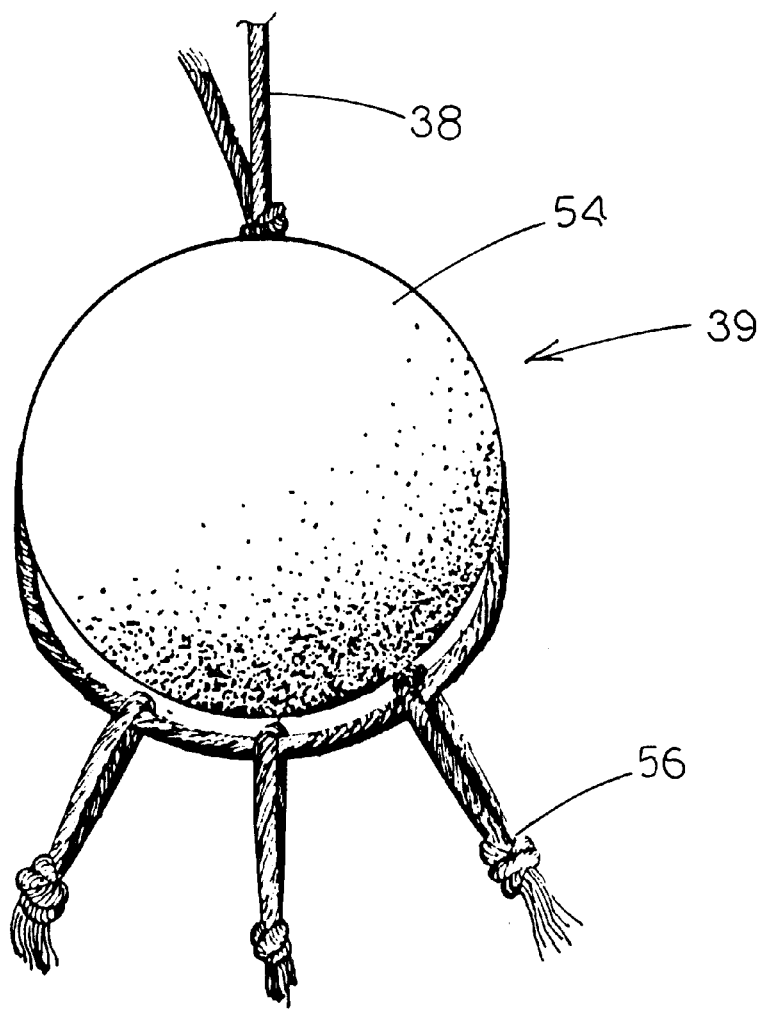
FIG. 4 is a side elevation view of the preferred dog toy for use with the suspended dog amusement apparatus of the present invention.
Figure 5A:
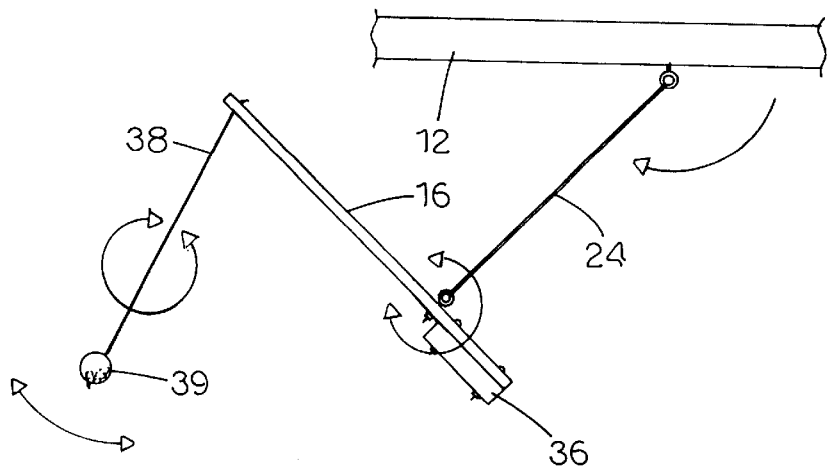
FIGS. 5A–5D are schematic figures depicting representative random movement sequences of the suspended dog amusement apparatus of the present invention.
Figure 5B:
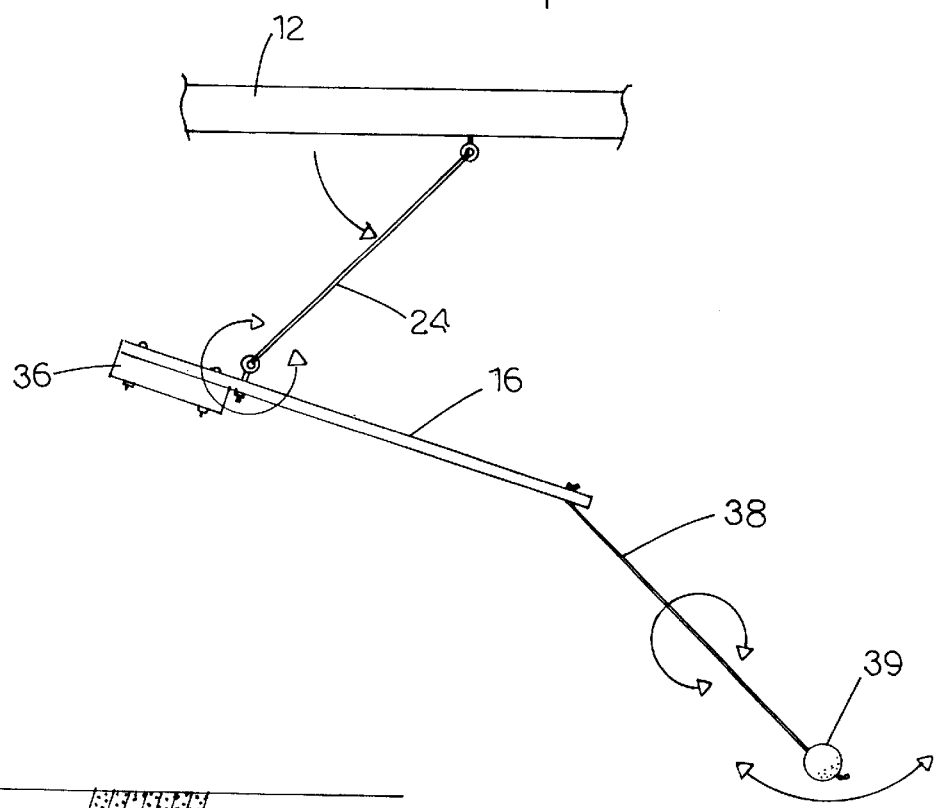
Figure 5C:
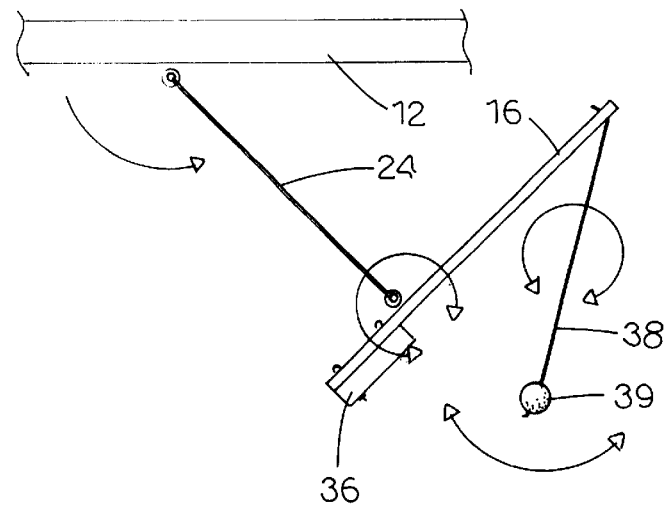
Figure 5D:
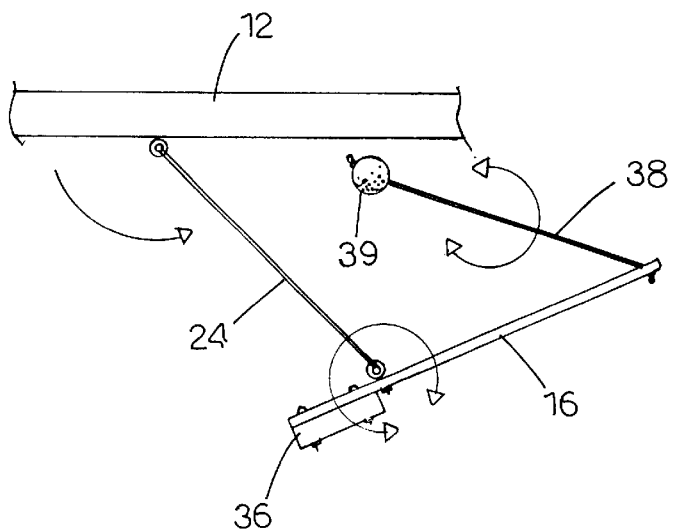

As more specifically shown in FIG. 4, the preferred dog toy 39 of the present invention is shown as a resilient ball 54, such as a tennis ball, with attached tassels 56 and is suspended from the strand-like member 38 of the second suspension element 37. This preferred dog toy provides great amusement for a dog and is longer lasting than typical rubber pet toys.

As shown in FIGS. 5A–5D, when a dog D first engages the apparatus 10 the dog D may pull the dog toy 39 towards it and thus will pull down the distal end 22 of the bar 16 which also causes the weighted proximal end 18 of the bar 16 to rise correspondingly. This unbalancing of the net torque forces T and T' will increase the torque forces T' felt on the distal end 22 of the bar in a downward manner, while the downward torque force T as felt on the proximal weighted end 18 of the bar remains the same. If and when the dog D releases the dog toy 39 the distal end of the bar 22, in an effort to equalize torque forces T and T', will immediately begin an upward movement carrying the tether 38 and dog toy 39 with it. Correspondingly, the weighted proximal end 18 of the bar 16 will immediately begin a downward movement. This upsetting of the static movement will result in a complex erratic swinging of a combination of the bar 16, the first suspension element 24 that attaches to the horizontal member 12 and the second suspension element 37 including the strand-like member 38 and dog toy 39 attached to the bar 16 itself. This erratic movement will continue for some time resulting in an exciting chase for the dog D. If and when the dog D gains back control of the dog toy 39, the bar 16 will resume a leveraged position as long as the dog D is providing the pulling force required.

In use, the large breed dog gains amusement and exercise of the jaw and neck muscles by biting and shaking the dog toy and pulling on the dog toy against the counterbalanced torque forces. The pulling action of the torque forces will often cause the dog to loose grip of the dog toy and the dog will chase it. When released, the unpredictable and erratic motion of the suspended apparatus will provide exercise to other important muscles as the dog attempts to chase the dog toy. Since the dogs seem to become highly involved and entertained in this form of play, the heart and other muscles are also exercised, thus aiding in improvement in the dog's overall health.

It will be understood that various details of the invention may be changed without departing from the scope of the invention. Furthermore, the foregoing description is for the purpose of illustration only, and not for the purpose of limitation—the invention being defined by the claims.

What is claimed is:

1. A suspended dog amusement system comprising;
    (a) a bar having a proximal end, a center point and a distal end;
    (b) a first suspension system for suspending the bar further comprising:
        (i) a strand-like member with two ends;
        (ii) an anchor located at ground level for use by the system's user;
        (iii) a plurality of pass-through devices;
        (iv) wherein one end of the strand-like member is attached at a support point located between the center point and the proximal end of the bar and the other end of the strand-like member is extending through the plurality of pass-through devices and secured to the anchor at ground level;
    (c) a weight element secured to the bar at a location between the support point and the proximal end of the bar for applying a first gravitational torque to the bar about the support point;
    (d) a second suspension element secured to the distal end of the bar that comprises a strand-like member attached to a resilient dog toy and which produces a second gravitational torque to the bar about the support point wherein the weight element and the second suspension element are in counterbalanced equilibrium when the system is at rest; and
    (e) whereby the first and second torques are such as to provide an unpredictable and random movement of the resilient dog toy when engaged by a dog.

2. The suspended dog amusement system of claim 1 wherein the bar is made of wood.

3. The suspended dog amusement system of claim 1 wherein the total length of the bar is in the range of 3 to 4 feet.

4. The suspended dog amusement system of claim 3 wherein the ratio of the distance between the distal end of the bar to the support point and the distance between the proximal end of the bar to the support point is approximately 3:1.

5. The suspended dog amusement system of claim 1 wherein the strand-like member of the first suspension system is a rope.

6. The suspended dog amusement system of claim 1 wherein the weight element has a weight in the range of about 7 to 10 pounds.

7. The suspended dog amusement system of claim 1 wherein the strand-like member of the second suspending element is secured by a quick-release mechanism.

8. The suspended dog amusement system of claim 1 wherein the resilient dog toy is a tennis ball.

* * * * *